United States Patent
Blum et al.

[11] Patent Number: 6,165,561
[45] Date of Patent: Dec. 26, 2000

[54] MULTILAYERED ENAMELLING PROCESS

[75] Inventors: Joachim Blum, Remscheid; Dieter Engel, Wuppertal; Klausjörg Klein, Wuppertal; Walter Kühhirt, Remscheid; Bettina Vogt-Birnbrich, Solingen, all of Germany

[73] Assignee: Herberts GmbH, Wuppertal, Germany

[21] Appl. No.: 09/254,168

[22] PCT Filed: Sep. 3, 1997

[86] PCT No.: PCT/EP97/04702

§ 371 Date: May 17, 1999

§ 102(e) Date: May 17, 1999

[87] PCT Pub. No.: WO98/09737

PCT Pub. Date: Mar. 12, 1998

[30] Foreign Application Priority Data

Sep. 3, 1996 [DE] Germany ............... 196 35 615
Sep. 3, 1996 [DE] Germany ............... 196 35 616

[51] Int. Cl.$^7$ ............... B05D 1/36; H05H 1/00
[52] U.S. Cl. ............... 427/409; 427/553; 427/535
[58] Field of Search ............... 427/421, 430.1, 427/553, 409, 224, 535, 533

[56] References Cited

U.S. PATENT DOCUMENTS

| 3,960,610 | 6/1976 | Steinbrecher et al. | 148/6.14 R |
|---|---|---|---|
| 4,373,050 | 2/1983 | Steinbrecher et al. | |
| 4,457,956 | 7/1984 | Park | 427/203 |
| 5,385,758 | 1/1995 | Ahmed | 427/421 |
| 5,532,025 | 7/1996 | Kinlen et al. | 427/388.1 |
| 5,728,431 | 3/1998 | Bergbreiter et al. | 427/388.1 |

FOREIGN PATENT DOCUMENTS

| 0 396 055 | 11/1990 | European Pat. Off. |
| 2 187 943 | 1/1994 | France |
| 89/11494 | 11/1989 | WIPO |
| 93/01244 | 1/1993 | WIPO |
| 94/28077 | 12/1994 | WIPO |
| 95/04113 | 2/1995 | WIPO |

OTHER PUBLICATIONS

EP455211, Derwent Abstract.
EP591681, Derwent Abstract.
WO 9507320, Derwent Abstract.
EP 397974, Derwent Abstract.
EP 53971, Derwent Abstract.

*Primary Examiner*—Timothy Meeks
*Assistant Examiner*—Jennifer Kolb
*Attorney, Agent, or Firm*—Pillsbury Madison & Sutro LLP

[57] ABSTRACT

This invention relates to a process for the production of a multilayer lacquer coating on a substrate having an autophoretically coatable, metallic surface, in which a first priming coat of an autophoretically depositable coating composition is autophoretically deposited and then stoved and one or more subsequent coats are then applied by spraying, wherein the autophoretically depositable coating composition contains one or more constituents having an adhesion promoting action and/or wherein before one or more further coats are applied by spraying, the stoved priming layer produced by autophoretic deposition is physically and/or chemically treated and/or provided with an adhesion promoting coat.

14 Claims, No Drawings

MULTILAYERED ENAMELLING PROCESS

This application is the national phase of international application PCT/EP97/04702 filed Sep. 3, 1997 which designated the U.S.

This invention relates to a process for the production of a multilayer lacquer coating on a substrate having an autophoretically coatable metallic surface.

High quality automotive original lacquer coatings are today generally produced by electrophoretic deposition of a primer providing corrosion protection on an unfinished vehicle body which is generally provided with a conversion layer, followed by spray application of subsequent layers, for example consisting of a surfacer layer and a subsequently applied decorative lacquer coating comprising a colouring and/or effect base lacquer layer and a protective clear lacquer layer which seals the surface. The conversion layer on the uncoated vehicle bodies is produced by chemical pretreatment, generally comprising phosphating and passivation, which involves considerable cost.

Lacquer coating of metallic substrates by autophoretic deposition of a coat of an autophoretically depositable coating composition is known as an electroless coating process which provides good corrosion protection results even when costly pretreatment is not performed, i.e. when the production of conversion layers, for example by phosphating and passivation, is omitted.

Direct overcoating of a coat produced by autophoretic deposition with one or more lacquer layers gives rises to multilayer lacquer coatings which have only slight adhesion and do not meet the requirements applicable to automotive original lacquer coatings.

The object of the present invention is to provide a process for the production of multilayer lacquer coatings, in particular automotive lacquer coatings, which have an autophoretically deposited lacquer layer as the primer. The autophoretically deposited coating is intended to replace the conventional electrocoated primer and the lacquer layers applied on the autophoretically deposited priming coat are intended to have good adhesion which in particular meets the elevated requirements of automotive original lacquer coating.

It has been found that this object may surprisingly be achieved by a process for the production of a multilayer lacquer coating on a substrate having an autophoretically coatable, metallic surface, in which a first priming coat of an autophoretically depositable coating composition is autophoretically deposited and then stoved and one or more subsequent coats are then applied by spraying, characterised in that the autophoretically depositable coating composition contains one or more constituents having an adhesion promoting action and/or that before one or more further coats are applied by spraying, the stoved priming layer produced by autophoretic deposition is physically and/or chemically treated and/or provided with an adhesion promoting coat.

A first embodiment of the present invention comprises a process for the production of a multilayer lacquer coating on a substrate having an autophoretically coatable, metallic surface, in which a first priming coat of an autophoretically depositable coating composition is autophoretically deposited and then stoved and one or more subsequent coats are then applied by spraying, characterised in that the autophoretically depositable coating composition contains one or more constituents having an adhesion promoting action.

A second embodiment of the present invention comprises a process for the production of a multilayer lacquer coating on a substrate having an autophoretically coatable, metallic surface, in which a first priming coat of an autophoretically depositable coating composition is autophoretically deposited and then stoved and one or more subsequent coats are then applied by spraying, characterised in that before one or more further coats are applied by spraying, the stoved priming layer produced by autophoretic deposition is physically and/or chemically treated and/or provided with an adhesion promoting coat. In the second embodiment of the process according to the invention, the autophoretically depositable coating composition contains no constituents having an adhesion promoting action.

A third embodiment of the present invention comprises a process for the production of a multilayer lacquer coating on a substrate having an autophoretically coatable, metallic surface, in which a first priming coat of an autophoretically depositable coating composition is autophoretically deposited and then stoved and one or more subsequent coats are then applied by spraying, characterised in that the autophoretically depositable coating composition contains one or more constituents having an adhesion promoting action and that before one or more further coats are applied by spraying, the stoved priming layer produced by autophoretic deposition is physically and/or chemically treated and/or provided with an adhesion promoting coat.

The first and second embodiments of the process according to the invention are preferred embodiments.

One or more further coats are applied by spraying onto the stoved priming layer produced by autophoretic deposition which contains adhesion promoting constituents and/or is physically and/or chemically treated and/or provided with an adhesion promoting coat. All per se conventional types of lacquer structures which may be applied by spraying onto electrophoretically deposited priming layers may here be considered, in particular those lacquer structures which are known for automotive original lacquer coating applications.

The multilayer lacquer coatings obtained using the process according to the invention surprisingly exhibit adhesion between the first, autophoretically deposited coat and the remaining coating layer(s) which is sufficient to meet the elevated requirements of automotive original lacquer coating.

Per se known autophoretically depositable coating compositions may be used in the process according to the invention to produce the first coat, the priming layer, wherein in the case of the first and third embodiments of the process according to the invention the sole restriction is that the autophoretically depositable coating composition contains one or more constituents having an adhesion promoting action.

The autophoretically depositable coating compositions are coating compositions based on aqueous binder dispersions with binder particles having a negative surface charge. By virtue of their generally acidic pH value of for example between 1 and 6, preferably of between 1.5 and 5.0, and their generally oxidising nature, autophoretic lacquers are capable of attacking sufficiently non-noble metal surfaces, so liberating the corresponding metal ions. If, in the vicinity of the metal surface, a metal ion concentration is consequently achieved which is sufficiently high to destabilise and coagulate the binder particles dispersed in the aqueous phase, a coating film is deposited on the metal surface.

The autophoretically depositable coating compositions usable in the process according to the invention generally have a low solids content of for example up to 20 wt. %, wherein the lower limit is generally, for example, 5 wt. %, and the upper limit, for example, 10 wt. %. In addition to an autophoretically depositable film-forming binder, water, acid and, in the case of the first and third embodiments of the process according to the invention, the constituents having an adhesion promoting action essential to the invention, the compositions generally also contain oxidising agents, optionally together with crosslinking agents for the binder, extenders, pigments and conventional lacquer additives.

The autophoretically depositable coating compositions usable according to the invention for the production of the first coat may be physically drying or be crosslinkable with the formation of covalent bonds. The autophoretic lacquers which crosslink with the formation of covalent bonds may be intrinsically or extrinsically crosslinking systems.

The autophoretic lacquers usable in the process according to the invention for the production of the first coat contain one or more film-forming binders which are per se neutral or have anionic groups. Especially in the event that the binders are not intrinsically crosslinking or physically drying (thermoplastic), they may optionally also contain crosslinking agents. The binders and optional crosslinking agents are present as an aqueous dispersion having a negative surface charge of the particles. The negative surface charge stabilises the dispersed particles in the aqueous phase. The negative surface charge may, for example, originate from anionic groups in the binder itself and/or, especially in the case of per se neutral binders, from an anionic emulsifier for the binder and the crosslinking agents. Examples of anionic groups in the binder are anionic groups of the binder itself, for example carboxyl groups or sulfonate groups, and/or anionic residues arising from binder production, for example from the production of a per se neutral binder. Examples of anionic residues arising from binder production are sulfate groups present in the binder as excess residues arising from peroxydisulfate initiated free-radical polymerisation. No restrictions in principle apply to either the binder component or the crosslinking component; conventional lacquer resins familiar to the person skilled in the art may be used. Examples of film-forming binders which may be used are polyester, polyurethane, epoxy and/or polymer resins. Polymer resins, i.e. binders produced by free-radical polymerisation, in particular by emulsion polymerisation or seed polymerisation, are particularly preferred for the purposes of the process according to the invention. Conventional aqueous, thermoplastic polymer dispersions (latices) which contain homo- or copolymers of olefinically unsaturated monomers having glass transition temperatures of for example between 0 and 100° C. as the disperse phase are particularly preferred. Examples of suitable olefinically unsaturated monomers for synthesising such homo- and copolymers are (meth)acrylic acid esters, such as for example methyl (meth)acrylate, ethyl (meth)acrylate, n-butyl (meth)acrylate, hydroxyethyl (meth)acrylate, hydroxypropyl (meth)acrylate, ethylhexyl (meth)acrylate; glycidyl esters of unsaturated carboxylic acids, such as for example glycidyl (meth)acrylate; (meth)acrylamide, (meth)acrylonitrile, sodium 2-sulfoethylmethacrylate, (meth)acrylic acid; as well as monomers without further functional groups or having different functional groups, such as for example ethylene, styrene, vinyl chloride, vinylidene chloride, vinyl acetate, butadiene. Examples of aqueous polymer dispersions suitable for the purposes of the invention are styrene/butadiene, butadiene/acrylonitrile, vinyl chloride, ethylene/vinyl acetate and vinylidene chloride copolymer dispersions, wherein the latter are particularly preferred.

Selection of the optionally present crosslinking agents is made on the basis of the functionality of the binders, i.e. the crosslinking agents are selected from among conventional crosslinking agents familiar to the person skilled in the art in such a manner that they have a reactive functionality complementary to the functionality of the binder. Examples of such complementary functionalities between binder and crosslinking agent are: hydroxyl/methylol ether, hydroxyl/blocked isocyanate. Provided that they are mutually compatible, two or more such complementary functionalities may also simultaneously be present in an autophoretic lacquer. The crosslinking agents optionally used in the autophoretic lacquers may be present individually or as a mixture.

The autophoretically depositable coating compositions contain one or more free acids in a quantity to establish the above-stated pH range and preferably also one or more oxidising agents. Examples of preferred acids are inorganic acids such as hydrochloric acid, phosphoric acid, sulfuric acid, nitric acid, and organic acids, such as formic acid, acetic acid. Hydrofluoric acid is particularly preferred. Examples of preferred oxidising agents are chromate, dichromate, bromate, chlorate, perchlorate, permanganate, persulfate, peroxydisulfate. Hydrogen peroxide is particularly preferred.

One particularly preferred combination of acid and oxidising agent is the combination hydrofluoric acid/hydrogen peroxide.

The autophoretically depositable coating compositions usable in the process according to the invention preferably contain pigments and/or extenders. Pigments which may be considered are, for example, conventional inorganic or organic, in particular acid-resistant pigments and/or extenders. Examples are carbon black, titanium dioxide, iron oxide pigments, kaolin, talcum or silicon dioxide, as well as anti-corrosion pigments.

When formulating the autophoretically depositable coating composition usable according to the invention, pigments and extenders may be used, for example, as pigment suspensions (pigment slurries) or ground pigment preparations in water and/or organic, water-miscible solvents, such as glycols, for example ethylene glycol, propylene glycol; alcohols, for example sec.-butanol and hexanol; glycol ethers, for example ethoxypropanol, methoxypropanol and butoxyethanol. Such ground pigment preparations are commercially available and are offered for sale, for example by the firm Hoechst, under the name Colanyl®. Aqueous, nonionically stabilised pigment dispersions may, for example, be mixed with anionically stabilised resin dispersions to yield pigment concentrates suitable for pigmenting autophoretic lacquers.

The autophoretically depositable coating compositions usable in the process according to the invention may furthermore contain conventional additives. Examples of these are conventional lacquer additives, such as wetting agents, anionic and/or nonionic emulsifiers, protective colloids, levelling agents, corrosion inhibitors, plasticisers, anti-foaming agents, solvents, for example as film-forming auxiliaries, light stabilisers, fluorides, in particular for example iron trifluoride, hydrogen fluorides, complex fluorine anions, for example tetrafluoroborates, hexafluorozirconates, hexafluorotitanates. Protective colloids and/or emulsifiers are in particular present only in the smallest possible quantities and preferably originate from the binder dispersions used in the formulation of the autophoretically depositable coating compositions. These are, for example, the protective colloids and/or emulsifiers used in the production of the binder dispersions.

Examples of compositions of autophoretic lacquers and binder systems which are in principle usable are described in: U.S. Pat. No. 3,592,699, U.S. Pat. No. 3,709,743, U.S. Pat. No. 3,776,848, U.S. Pat. No. 3,791,431, U.S. Pat. No. 4,104,424, EP-A-0 037 750, EP-A-0 132 828, EP-A-0 310 708, DE-A 37 27 382, WO 91 05 023, WO 94 06 861.

In the case of the first and third embodiments of the process according to the invention, the autophoretically depositable coating compositions contain one or more constituents having an adhesion promoting action. Examples of such constituents are in particular those known or recommended for lacquer coating plastic components made from polyolefin plastics, such as for example polyethylene or polypropylene. Adhesion promoting coating compositions for lacquer coating plastic components are accordingly known which contain one or more constituents which have an adhesion promoting action alone or as an additive in combination with binders or binder systems. Examples of components having an adhesion promoting action which are preferred for lacquer coating plastics and are also advantageously usable in the process according to the invention are polyolefins, which are chlorinated and/or provided with carboxyl groups, for example by maleation (reaction with maleic anhydride) and optionally further chemically modified. Such polyolefins containing chlorine having number average molecular weights of 5000 to 50000 at a chlorine content of 10 to 40 wt. % are preferred.

Examples of polyolefins, which are chlorinated and/or provided with carboxyl groups, for example by maleation (reaction with maleic anhydride) and optionally further chemically modified or adhesion promoting coating compositions containing such products for lacquer coating plastics are described in EP-A-0 396 055, EP-A-0 397 974, EP-A-0 539 710, WO 89 11 494, WO 93 01 244, WO 94 28 077, WO 95 04 113.

Relative to the solids content of the autophoretically deposited coating composition, the proportion of the constituent(s) having an adhesion promoting action is, for example, between 1 and 30 wt. %, preferably between 2 and 25 wt. %.

The constituents having an adhesion promoting action may be added to the autophoretic coating composition as such, optionally with the assistance of an anionic and/or nonionic emulsifier and/or solvent. The constituents having an adhesion promoting action may, for example, be added as an aqueous emulsion. It is, for example, also possible to add the constituents having an adhesion promoting action during production of the binder, such that they pass into the autophoretic coating composition used according to the invention in this manner.

In the case of the second and third embodiments of the process according to the invention, the priming layer, produced by autophoretic deposition and stoved, is physically and/or chemically treated and/or provided with an adhesion promoting coat before one or more further coats are applied by spraying. Such treatment involves methods for producing sufficient adhesion as are in particular known from lacquer coating plastic components made from polyolefin plastics, such as for example polyethylene or polypropylene. There are numerous publications and considerable patent literature relating to lacquer coating plastics, but such references contain no indication which would encourage the person skilled in the art to apply the above-mentioned methods to coatings produced autophoretically.

Examples of physical or chemical methods which may be used in the second and third embodiments of the process according to the invention for treating the stoved autophoretic priming layer and are known from the lacquer coating of polyolefin plastics are corona treatment, plasma treatment, flame treatment, irradiation with ultraviolet light, optionally in the presence of photoinitiators which decompose into free radicals, etching with aggressive chemical agents, for example with fluorine or sulfur trioxide. In the process according to the invention, these treatment methods may be used alone or in combination, either simultaneously or consecutively. Flame treatment or plasma treatment of the stoved priming layer produced by autophoretic deposition are preferred treatment methods in the second and third embodiments of the process according to the invention. It is, however, particularly preferred in the second and third embodiments of the process according to the invention to apply an adhesion promoting coat onto the stoved and optionally physically and/or chemically treated, autophoretically deposited priming layer, before one or more further coats are applied by spraying. The autophoretically deposited and stoved priming layer is here preferably not physically and/or chemically treated and only an adhesion promoting coat is applied, before one or more further coats are applied. The adhesion promoting coat is preferably applied by spraying.

The adhesion promoting coat may be applied from an adhesion promoting coating composition. Adhesion promoting coating compositions are liquid coating compositions which are water-based or based on organic solvents. These are, for example, conventional adhesion primers, in particular those as are offered for sale for use on polyolefin plastics and contain a binder system tailored for adhesion. Examples of such binder systems are epoxy/amine and polyurethane systems. The adhesion promoting coating compositions used in the process according to the invention, however, preferably contain one or more constituents having an adhesion promoting action. The adhesion promoting components may be present alone or as an additive in combination with binders or binder systems. The proportion of adhesion promoting component in the adhesion promoting coating composition is here, for example, between 2 and 25, preferably between 3 and 20 wt. %. The adhesion promoting coating compositions are in particular those as are known or recommended for lacquer coating plastic components made from polyolefin plastics, such as polyethylene or polypropylene. They are preferably applied by spraying, generally to a dry film thickness dependent upon the nature of the adhesion promoting coating composition, of for example between 1 and 30 $\mu$m. Before further overcoating, the coats produced from the adhesion promoting coating compositions are generally dried or, in the event that a chemically curable binder system is present, cured, for example at temperatures of between 20 and 130° C.

Examples of preferred components having an adhesion promoting action are the same as are described above as usable in the autophoretic lacquers themselves.

The adhesion promoting component(s) may also be constituent(s) of the coating composition sprayed directly onto the autophoretic primer and be present, for example, in a quantity of 2 to 30 wt. %, relative to the solid resin content of the spray coating composition, i.e. the adhesion promoting coat need not here be applied from a separate adhesion promoting coating composition. Examples of coating compositions sprayed directly onto the autophoretic primer are surfacers, base lacquers and topcoat lacquers. Base lacquer systems which contain chlorinated polyolefins as the adhesion promoting constituents and are suitable for direct lacquer coating of polyolefin plastics are described in EP-A-0 455 211, EP-A-0 591 681 and WO 95 07 320.

One or more further coats are applied by spraying onto the staved priming layer produced by autophoretic deposition which contains adhesion promoting constituents and/or has been physically and/or chemically treated and/or provided with an adhesion promoting coat. Any conventional type of lacquer structure which may be applied by spraying onto priming layers produced by electrophoretic deposition may here be considered, in particular such lacquer structures as are known from the automotive original lacquer coating sector.

Examples of multilayer lacquer coatings which may be produced using the preferred embodiments (first and second embodiments) of the process according to the invention and are in particular suitable as automotive lacquer coatings are:

1) autophoretic primer/optional adhesion promoting coat/subsequent coats: surfacer/hue-determining base lacquer/clear lacquer.
2) autophoretic primer/optional adhesion promoting coat/subsequent coats: first, modified base lacquer/second, hue-determining base lacquer/clear lacquer.
3) autophoretic primer/optional adhesion promoting coat/subsequent coats: hue-determining base lacquer/clear lacquer.
4) autophoretic primer/optional adhesion promoting coat/subsequent coats: surfacer/hue-determining topcoat lacquer.
5) autophoretic primer/optional adhesion promoting coat/subsequent coat: hue-determining topcoat lacquer.

In the first embodiment of the process according to the invention, the autophoretic primer contains one or more constituents having an adhesion promoting action. The first coat sprayed directly onto the autophoretic primer may comprise a surfacer, base lacquer, modified base lacquer or topcoat lacquer layer.

In the second embodiment of the process according to the invention, the autophoretic primer containing no constituents having an adhesion promoting action is either physically and/or chemically treated and/or provided with an adhesion promoting coat and the multilayer lacquer coatings produced using the process according to the invention comprise one or more subsequent layers, or multilayer lacquer coatings are obtained which consist of the untreated autophoretic primer containing no constituents having an adhesion promoting action and one or more subsequent layers sprayed directly thereon. The first coat sprayed directly on the autophoretic primer here contains one or more components having an adhesion promoting action. The first coat sprayed directly onto the autophoretic primer may comprise a surfacer, base lacquer, modified base lacquer or topcoat lacquer layer.

Surfacers which may be used in the process according to the invention are any per se known conventional surfacer coating compositions, as are used for the production of surfacer layers which provide surface smoothing and stone impact protection in multilayer lacquer coatings, in particular automotive multilayer lacquer coatings, and are known in great numbers, for example from patent literature. Examples are powder surfacers, aqueous surfacers and surfacers based on organic solvents. These are generally lacquer systems which cure on stoving with the formation of covalent bonds as a result of chemical crosslinking.

The surfacers contain one or more conventional film-forming binders, optionally together with crosslinking agents and generally conventional pigments and extenders. Hydroxy-functional polyester and/or polyurethane resins may, for example, preferably be used as the film-forming binders. Preferred crosslinking agents are amino resins and/or blocked polyisocyanate crosslinking agents. Examples of pigments and extenders are carbon black, titanium dioxide, finely dispersed silicon dioxide, aluminosilicate (for example kaolin), magnesium silicate (for example talcum), calcium carbonate (for example chalk), barium sulphate (for example barytes), iron oxide pigments.

The surfacers are applied by spraying to dry film thicknesses of 25 to 45 $\mu$m and are generally stoved at temperatures of between 120 and 180° C.

Base lacquers which may be used are per se known colouring and/or effect base lacquer coating compositions and so determine the hue of the multilayer lacquer coatings produced according to the invention as are used for the production of base coat/clear coat two layer lacquer coatings and are known in great numbers for example from the patent literature.

The base lacquers usable according to the invention may be physically drying or be crosslinkable with the formation of covalent bonds. The base lacquers which crosslink with the formation of covalent bonds may be intrinsically or extrinsically crosslinking systems.

The colouring and/or effect base lacquers usable in the process according to the invention are liquid coating compositions. They may comprise single or multi-component coating compositions, with single component compositions being preferred. They may comprise systems based on organic solvents or, preferably, waterborne base lacquers.

The base lacquer coating compositions usable in the process according to the invention comprise conventional lacquer systems containing one or more conventional film-forming binders. In the event that the binders are not intrinsically crosslinking or self-drying, they may optionally also contain crosslinking agents. No restrictions apply to either the binder component or the crosslinking component. Film-forming binders which may be used are, for example, polyester, polyurethane and/or (meth)acrylic copolymer resins. In the case of the preferred waterborne base lacquers, polyurethane resins are preferably present, particularly preferably in a minimum proportion of 15 wt. %, relative to the solid resin content of the waterborne base lacquer. Selection of the optionally present crosslinking agents is not critical and is determined in accordance with binder functionality.

In addition to the conventional physically drying and/or chemically crosslinking binders, the base lacquers used in the process according to the invention contain inorganic and/or organic colouring and/or effect pigments, such as for example titanium dioxide, iron oxide pigments, carbon black, azo pigments, phthalocyanine pigments, quinacridone pigments, metal pigments, for example made from titanium, aluminium or copper, interference pigments, such as for example aluminium coated with titanium dioxide, coated mica, graphite effect pigments, lamellar iron oxide, lamellar copper phthalocyanine pigments.

The base lacquers may furthermore contain conventional lacquer additives, such as for example extenders, catalysts, levelling agents, anti-cratering agents or in particular light stabilisers, optionally in combination with anti-oxidants.

The base lacquer layer may be applied as a two-coat base lacquer system consisting of a first, modified base lacquer layer and a second base lacquer layer which determines the actual hue of the multilayer lacquer coating produced according to the invention. In this case, the first base lacquer assumes important surfacing functions, such as for example surface smoothing and stone impact protection. This lacquer is accordingly modified, for example by containing additional modifying binder components or extender components. It may, for example, be produced from the subsequently applied base lacquer which determines the actual hue by blending with the additional components.

Suitable clear lacquer coating compositions are in principle any conventional clear lacquers or transparently pigmented coloured or colourless coating compositions. The compositions may comprise single or multi-component clear lacquer coating compositions. They may be solvent-free (liquid or as powder coating) or they may comprise systems based on solvents or water-borne clear lacquers, the binder systems of which are appropriately, for example anionically, cationically or nonionically, stabilised. The water-borne clear lacquer systems may comprise water-soluble or water-dispersed systems, for example emulsion systems or powder slurry systems. The clear lacquer coating compositions cure on stoving with the formation of covalent bonds as a result of chemical crosslinking.

The clear lacquers usable in the process according to the invention comprise conventional clear lacquer coating compositions which contain one or more conventional film-forming binders. No restrictions apply to either the binder component or the crosslinking component. Film-forming binders which may be used are, for example, polyester, polyurethane and/or (meth)acrylic copolymer resins. Selection of the optionally present crosslinking agents is not critical and is determined in accordance with binder functionality.

In addition to the chemically crosslinking binders optionally together with crosslinking agents, the clear lacquers usable in the process according to the invention may contain conventional lacquer additives, such as for example catalysts, levelling agents, colorants, but in particular rheological control agents, such as microgels, NAD (non-aqueous dispersions), disubstituted ureas ("sagging control agents"), together with light stabilisers, optionally in combination with antioxidants.

The transparent coating may be applied in a single layer or in the form of two or more layers of the same or various different transparent coating compositions. The transparent coat is, however, conveniently applied from only one clear lacquer coating composition.

The topcoat lacquers comprise the topcoat lacquers based on water or on organic solvents or powder topcoat compositions conventional for the production of a colouring and/or effect layer. The topcoat lacquers are based on per se known binder/crosslinking agent systems, such as for example already described above in relation to the clear lacquers. The topcoat lacquers contain colouring and/or effect pigments, as are for example described above for the base lacquers. The topcoat lacquers are applied by spraying to a dry film thickness of for example 30 to 80 $\mu$m and stoved, for example, at temperatures of between 120 and 160° C.

Preferred multilayer lacquer coatings produced using the process according to the invention are those having a two-layer base coat/clear topcoat lacquer coating as the hue-determining topcoat lacquer layer. The base lacquer layer of the colouring and/or effect base lacquer is here sprayed to a dry film thickness dependent upon the hue of generally 10 to 30 $\mu$m, for example by compressed air spraying, airless spraying or electrostatic high speed rotary spraying. Once the base lacquer layer has been applied, after a brief flash-off phase, for example at 20 to 80° C., the clear lacquer is applied, preferably using the wet-on-wet process. The clear lacquer layer is applied from a conventional liquid clear lacquer or clear powder coating (in which case the process involves dry-on-wet application) and stoved together with the base lacquer layer, for example at temperatures of 80 to 160° C.

Preferred substrates for the process according to the invention are autophoretically coatable unfinished vehicle bodies having metallic surfaces. These bodies may be produced from a single metal or, if composite methods are used, from two or more metallic materials and/or from plastic components provided with an appropriate metal layer. Metallic surfaces which may be considered are conventional metal surfaces familiar to the person skilled in the art which may be attacked by autophoretic lacquer systems, in particular at an acidic pH of for example between 1 and 6 with liberation of metal ions, for example made from iron, zinc, aluminium or corresponding alloys, as well as galvanised steel surfaces. The metal surfaces may be pretreated, for example provided with a phosphating and optionally passivating treatment. However, this is not necessary from an anti-corrosion standpoint and is consequently a further advantage of the process according to the invention. It should be noted that the phrase "unfinished bodies" used in the present invention in particular includes not only unfinished automotive bodies but also components thereof and automotive chassis parts having visible surfaces.

The first coat of the autophoretically depositable coating composition is autophoretically deposited onto these substrates in the conventional manner, preferably using the dipping process, preferably to a dry film thickness of for example 5 to 25 $\mu$m, particularly preferably of 10 to 20 $\mu$m.

Before stoving, the autophoretically deposited priming layer may be post-treated, for example rinsed, with water and/or optionally with special solutions. (In connection with the application of the autophoretically depositable coating composition, depending upon the nature of the autophoretic lacquer system, the term "stoving" may mean stoving with chemical crosslinking of the autophoretic coat or purely physical drying at elevated temperature, preferably with fusing or sintering and formation of a continuous autophoretic lacquer coating). After stoving at the temperatures adapted to the autophoretic lacquer system used of between 80 and 190° C., for example preferably between 100 and 160° C., the resultant substrate is provided with one or more further coats by spraying or is first physically and/or chemically treated and/or provided with an adhesion promoting coat, before one or more further coats are applied by spraying as described above.

The purpose of the autophoretically deposited priming layer is in particular to provide protection against chemical and corrosive attack. The priming layer preferably extends over the entire surface of the, for example, three-dimensional substrate. The physical and/or chemical treatment and/or application of an adhesion promoting coat on the priming coat which are performed in the case of the second and third embodiments of the process according to the invention, may, but need not, extend over the entire surface of the, for example, three-dimensional substrate. It is accordingly, for example, preferred to provide a first coat over the entire surface by autophoretic deposition from the autophoretic lacquer and to proceed with physical and/or chemical treatment and/or application of an adhesion promoting coat substantially only on external areas, in particular on the visible surfaces of a three-dimensional substrate, i.e. for example not in constricted cavities in a vehicle body. The same applies (in all three embodiments of the process according to the invention) with regard to the subsequent layers applied by spraying, i.e. spray application of one or more subsequent coats is preferably performed substantially only on external areas, in particular on the visible surfaces of a three-dimensional substrate, i.e. for example not in constricted cavities in a vehicle body.

The process according to the invention permits the production of multilayer lacquer coatings, in particular automotive lacquer coatings, having an overall range of properties comparable with the prior art, i.e. the overall technical and optical properties match those of multilayer lacquer coatings which have conventional conversion layers and an electrocoated primer instead of the autophoretic primer which contains adhesion promoting constituents and/or has been physically and/or chemically treated and/or provided with an adhesion promoting coat. The adhesion of the lacquer layers produced using the process according to the invention to each other and to the autophoretic primer meets the elevated requirements of automotive original lacquer coating.

What is claimed is:

1. A process for the production of a multilayer lacquer coating on a substrate having an autophoretically coatable, metallic surface, in which a first priming coat of an autophoretically depositable coating composition is autophoretically deposited and then stoved and one or more subsequent coats are then applied by spraying, wherein the autophoretically depositable coating composition is provided with at least one of the following:
(i) the coating composition contains one or more constituents having an adhesion promoting action;
(ii) before one or more further coats are applied by spraying, the stoved priming layer produced by autophoretic deposition is treated with at least one treatment selected from the group consisting of physical treatment, chemical treatment with an aggressive chemical agent and application of an adhesion promoting coat;
wherein in coating a three-dimensional substrate, the first autophoretically deposited coating is applied over the entire surface and the at least one treatment selected from the group consisting of physical treatment, chemical treatment with an aggressive chemical agent and application of an adhesion promoting coat, is performed only on external areas.

2. Process according to claim 1, characterised in that the autophoretically depositable coating composition contains polyolefins, which are provided with carboxyl groups by reaction with maleic anhydride as the adhesion promoting agent.

3. Process according to claim 1, characterised in that the content of the constituents having an adhesion promoting action in the autophoretically depositable coating composition amounts to 1 to 30 wt. %, relative to the resin solids content of the autophoretically depositable coating composition.

4. Process according claim 1, characterised in that the priming layer is subjected to corona treatment, plasma treatment, flame treatment, irradiation with ultraviolet light and/or etching with aggressive chemical agents.

5. Process according to claim 1, wherein a coating composition containing an epoxy/amine or a polyurethane system as the binder is applied as an adhesion promoting coat.

6. Process according to claim 2, wherein the coating composition contains 2 to 25 wt. % of polyolefins, which are provided with carboxyl groups by reaction with maleic anhydride.

7. Process according to claim 1, wherein the coating composition applied on the priming layer produced by autophoretic deposition in order to produce the subsequent coat is a surfacer, base lacquer or modified base lacquer and contains one or more adhesion promoting components.

8. Process according to claim 2, characterized in that the content of the constituent(s) having an adhesion promoting action in the autophoretically depositable coating composition amounts to 1 to 30 wt. %, relative to the resin solids content of the autophoretically depositable coating composition.

9. Process according to claim 2, characterized in that the priming layer is subjected to corona treatment, plasma treatment, flame treatment, irradiation with ultraviolet light and/or etching with aggressive chemical agents.

10. Process according to claim 3, characterized in that the priming layer is subjected to corona treatment, plasma treatment, flame treatment, irradiation with ultraviolet light and/or etching with aggressive chemical agents.

11. Process according to claim 5, characterized in that the priming layer is subjected to corona treatment, plasma treatment, flame treatment, irradiation with ultraviolet light and/or etching with aggressive chemical agents.

12. A process for the production of a multilayer lacquer coating on a substrate having an autophoretically coatable, metallic surface, in which a first priming coat of an autophoretically depositable coating composition is autophoretically deposited and then stoved and one or more subsequent coats are then applied by spraying, wherein the autophoretically depositable coating composition is provided with at least one of the following:
(i) the coating composition contains one or more constituents having an adhesion promoting action;
(ii) before one or more further coats are applied by spraying, the stoved priming layer produced by autophoretic deposition is treated with at least one treatment selected from the group consisting of physical treatment, chemical treatment with an aggressive chemical agent and application of an adhesion promoting coat;
wherein the aggressive chemical agent includes fluorine or sulfur trioxide.

13. Process according to claim 1, wherein the autophoretically depositable coating composition contains 2 to 25 wt. % of polyolefins, which are chlorinated.

14. Process according to claim 2, wherein the coating composition contains 2 to 25 wt. % of polyolefins, which are chlorinated.

* * * * *